(12) United States Patent
Buck (10) Patent No.: US 11,497,338 B2
(45) Date of Patent: Nov. 15, 2022

(54) APPARATUS FOR REMOVING LEAVES FROM STEMS OF HERBS AND SPICES, AND METHODS OF USING THE SAME

(71) Applicant: Kendall Ann Buck, Fleming Island, FL (US)

(72) Inventor: Kendall Ann Buck, Fleming Island, FL (US)

( * ) Notice: Subject to any disclaimer, the term of this patent is extended or adjusted under 35 U.S.C. 154(b) by 0 days.

(21) Appl. No.: 17/178,248

(22) Filed: Feb. 18, 2021

(65) Prior Publication Data

US 2021/0251413 A1      Aug. 19, 2021

Related U.S. Application Data

(60) Provisional application No. 62/978,116, filed on Feb. 18, 2020.

(51) Int. Cl.
*A47J 17/00*      (2006.01)
*A47J 43/28*      (2006.01)

(52) U.S. Cl.
CPC .............. *A47J 17/00* (2013.01); *A47J 43/288* (2013.01)

(58) Field of Classification Search
CPC ....... Y10S 83/932; A47J 17/00; A47J 43/288; B26B 11/00; B26B 11/006
USPC .......................................................... 30/123
See application file for complete search history.

(56) References Cited

U.S. PATENT DOCUMENTS

| | | | | |
|---|---|---|---|---|
| 1,781,837 | A * | 11/1930 | Funk | A47J 43/288 294/32 |
| 3,769,706 | A * | 11/1973 | Ashdown | A47J 17/00 30/113.3 |
| 5,044,115 | A * | 9/1991 | Richardson | A01G 5/00 47/1.01 R |
| 5,561,904 | A * | 10/1996 | Chung | A01G 5/00 30/234 |
| 6,247,736 | B1 * | 6/2001 | Esterson | A47J 43/288 294/7 |
| 10,245,737 | B2 | 4/2019 | Ryun et al. | |
| 2012/0198700 | A1 * | 8/2012 | Cotter | A47J 17/02 30/123 |
| 2012/0297548 | A1 * | 11/2012 | Solari | A47J 43/283 7/113 |
| 2018/0194020 | A1 | 7/2018 | Waymire | |
| 2018/0263273 | A1 * | 9/2018 | Dickie | A23N 15/02 |

* cited by examiner

*Primary Examiner* — Phong H Nguyen
(74) *Attorney, Agent, or Firm* — GFD Patents, LLC; Gerald F. Dudding (57) ABSTRACT

The invention is an apparatus for removing leaves from the stems of herbs and spices. The device comprises a handle and a rake block. The handle is operably coupled to the rake block at a proximal end. The rake block has a first side and a second side. The first side of the rake block has a first set of teeth. The second side of the rake block has a second set of teeth. The first set of teeth and the second set of teeth are different shapes.

17 Claims, 10 Drawing Sheets

Fig. 8A continued from step 147

149 — exerting force on the stem(s) and the apparatus through the first and second hand (126, 127) such that the majority of the stem(s) (250) pass through the gap(s) (21, 33) of the first or second set of teeth (15, 17) starting from the first end(s) of the stem(s).

APPARATUS FOR REMOVING LEAVES FROM STEMS OF HERBS AND SPICES, AND METHODS OF USING THE SAME

FIELD OF THE INVENTION

The present invention relates generally to devices used to remove leaves and stems from herbs and spices, and ready them for use in cooking. More specifically, the present invention is related to rakes that have a plurality of teeth separated by gaps, the heights and widths of said gaps having pre-determined dimensions to optimize removal of the leave and stems from the herbs and spices.

BACKGROUND

Herbs and spices often require the separation of stems and leaves before use in cooking. If done by hand, this is a tedious and time-consuming process. Therefore, there is a need for a device that can be applied to strip leaves and stems off of herbs and spices.

SUMMARY OF THE INVENTION

A first aspect of the present invention provides an apparatus for removing leaves from the stems of herbs and spices, comprising: a handle (3); a rake block (9); and a plurality of transverse channels (39, 41, 43), arranged in a longitudinal array (130), wherein each transverse channel (39, 41, 43) has sequentially smaller diameters, wherein the handle (3) is operably coupled to the rake block (9) at a proximal end (5), wherein the rake block has a first side (11) and a second side (13), wherein the first side of the rake block has a first set of teeth (15), wherein the second side of the rake block has a second set of teeth (17), and wherein the first set of teeth and the second set of teeth are different shapes.

A second aspect of the present invention provides a method of stripping leaves from stem(s) or spice, comprising: providing the apparatus of claim 1; holding the handle of the apparatus in a first hand; holding the stem(s) of the herbs or the stem(s) of the spice against a flat cutting surface with a second hand; locating the apparatus over the flat cutting surface such that the handle of the apparatus is substantially parallel to a plane of the flat cutting surface; placing first end(s) of the stem(s) in a gap(s) between the first set of teeth or the second set of teeth; exerting force on the stem(s) and the apparatus through the first and second hand such that the majority of the stem(s) pass through the gap(s) of the first or second set of teeth starting from the first end(s) of the stem(s), wherein the leaves of the herb(s) or spice which are unable to pass through the gaps between the teeth and are stripped from the stem(s).

A third aspect of the present invention provides a method of stripping leaves from stem(s) or spice, comprising: providing the apparatus of claim 7; holding the handle of the apparatus in a first hand, between the rake block and the plurality of transverse channels; selecting the transverse channel having a diameter sized such that pulling the first end of the stem(s) of the herb(s) or spice through the selected transverse channel produces resistance, and the leaves of the herb(s) and spice are unable to pass through the selected transverse channel and are pinched from the stem, wherein the leaves pinched from the stem preserve their aesthetic appeal for use in garnishes or other decoration.

BRIEF DESCRIPTION OF THE DRAWINGS

The features of the invention are set forth in the appended claims. The invention itself, however, will be best understood by reference to the following detailed description of an illustrative embodiment when read in conjunction with the accompanying drawings, wherein:

DETAILED DESCRIPTION OF THE EMBODIMENTS OF THE INVENTION

Figure 1:
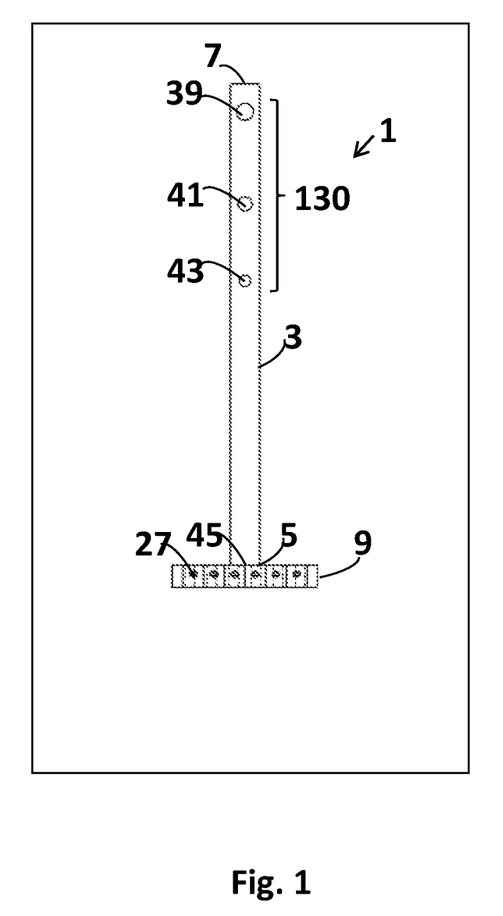
FIG. 1 depicts an elevated top perspective view of the apparatus, in accordance with embodiments of the invention.

FIG. 1 provides an elevated top perspective view of the apparatus 1, in accordance with embodiments of the invention. The invention is an apparatus 1 for removing leaves from the stems of herbs and spices. The device comprises a handle 3 and a rake block 9. The handle 3 is operably coupled to the rake block 9 at a proximal end 5. In one embodiment, a length of the handle between proximal and distal ends is from about 12 cm to about 18 cm and a width of the rake block 9 is from about 4 cm to about 6 cm. The rake block 9 has a first side and a second side 11, 13. The first side 11 of the rake block 9 has a first set of teeth 15. The second side 13 of the rake block 9 has a second set of teeth 17. The first set of teeth and the second set of teeth 15, 17 are different shapes. When put into use, leaves of an herb or spice are stripped from a stem on two sides by sides of the teeth as the apparatus 1 is pulled over the stems.

Figure 2:
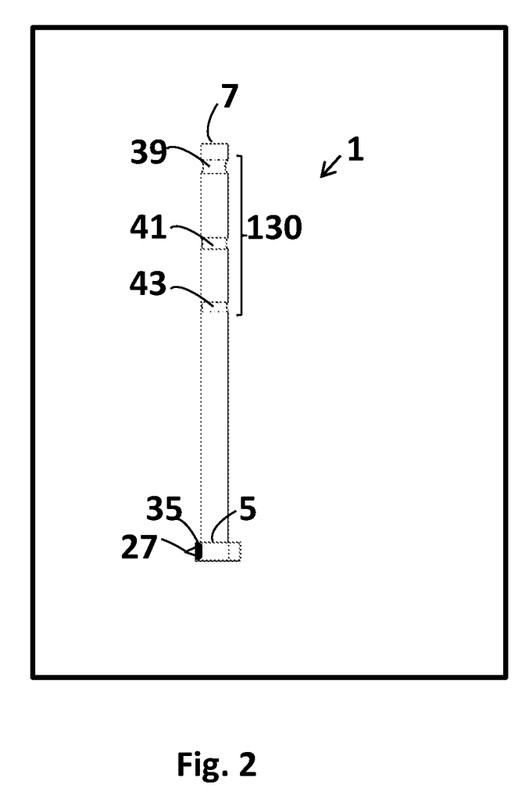
FIG. 2 depicts a side view of the apparatus, in accordance with embodiments of the invention.
Figure 3:
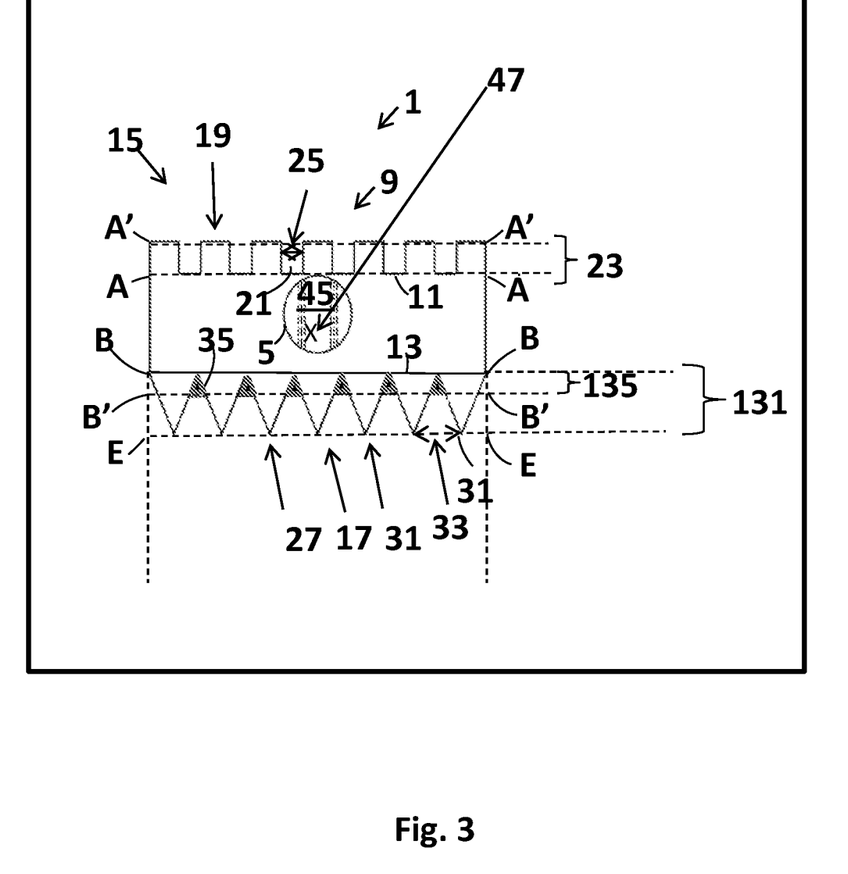
FIG. 3 depicts a front view of the apparatus, in accordance with embodiments of the present invention.

In one embodiment, the first set of teeth 15 is selected from the group consisting of rectangular or square prism shaped teeth 19, with rectangular or square prism shaped gaps 21 between them. In one embodiment, each rectangular or square prism shaped tooth 19 has a height 23 equal to the length of the line A-A', from about 0.5 cm to about 0.7 cm, and a width from about 0.3 cm to about 0.5 cm, and wherein the gap 21 between each rectangular or square prism shaped tooth has a width equal to a length of a double headed arrow 25 from about 0.35 cm to about 0.5 cm In one embodiment, the apparatus additionally comprises a plurality of transverse channels 39, 41, 43, arranged in a longitudinal array 130, wherein each transverse channel 39, 41, 43 has sequentially smaller diameters, as shown in FIGS. 1 and 2. In one embodiment, the diameter of each transverse channel 39, 41, 43 is selected from the group consisting of 2.5 mm, 3 mm, 4 mm, 5 mm, 6 mm, 7 mm, and 13 mm. In another embodiment, the diameter of each transverse channel is advantageously selected from the group consisting of 0.4 cm, 0.5 cm and 0.6 cm. The teeth 15, 17 of the apparatus 1 are optimized for stems larger than the stems that fit through the transverse channels that form the longitudinal array 130.

In one embodiment, the longitudinal array 130 extends from the distal end 7 of the handle 3, the transverse channels of the longitudinal array are substantially equally separated from each subsequent transverse channel, as measured from the center of each transverse channel, and the separation of the nearest transverse channel from the distal end 7 is the same separation as its separation from subsequent transverse channels.

In one embodiment, the longitudinal array 130 has three transverse channels 39, 41, 43, and the holes of the longitudinal array 130 are separated from subsequent transverse channels or from the distal end 7 by from about 1 cm.

In an embodiment, the transverse channels of the longitudinal array 130 are substantially smooth and cylindrical.

In an embodiment, the handle 3 is cylindrical.

In an embodiment, the handle 3 is operably coupled to the rake block at a connection point 45 that is offset of a midpoint 47 of the rake block 9, and the connection point 45 is closer to the first side 11 of the rake block 9.

In one embodiment, the handle 3 and the rake block 9 are of a one-piece construction.

In one embodiment, the handle 3 and the rake block 9 are seamless.

FIG. 2 provides a side view of the apparatus 1, in accordance with embodiments of the invention. FIG. 2 provides a view of the longitudinal array 130 of transverse channels, each subsequent transverse channel 39, 41, 43 having a smaller diameter, the pressure blocks 35, and the triangular shaped teeth 27.

FIG. 3 provides a cross sectional view of the rake block 9 of the apparatus 1, in accordance with embodiments of the present invention. In one embodiment, each rectangular or square prism shaped tooth 19 has a height 23 equal to the length of the line A-A', as shown in FIG. 3, from about 0.5 cm to about 0.7 cm. The gap 21 between each rectangular or square prism shaped tooth has a width equal to a length of a double headed arrow 25 from about 0.35 cm to about 0.5 cm, as shown in FIG. 3.

In an embodiment, the second set of teeth 17 is selected from the group consisting of triangular prism shaped teeth 27 having triangular prism shaped gaps 33 between them.

In one embodiment, each triangular prism shaped tooth 27 forms a top or highest edge 31 along the line E-E, as shown in FIG. 3. The gap 33 between adjacent tops or highest edges 31 of the triangular prism shaped teeth is about 0.8 cm in length.

Figure 7:
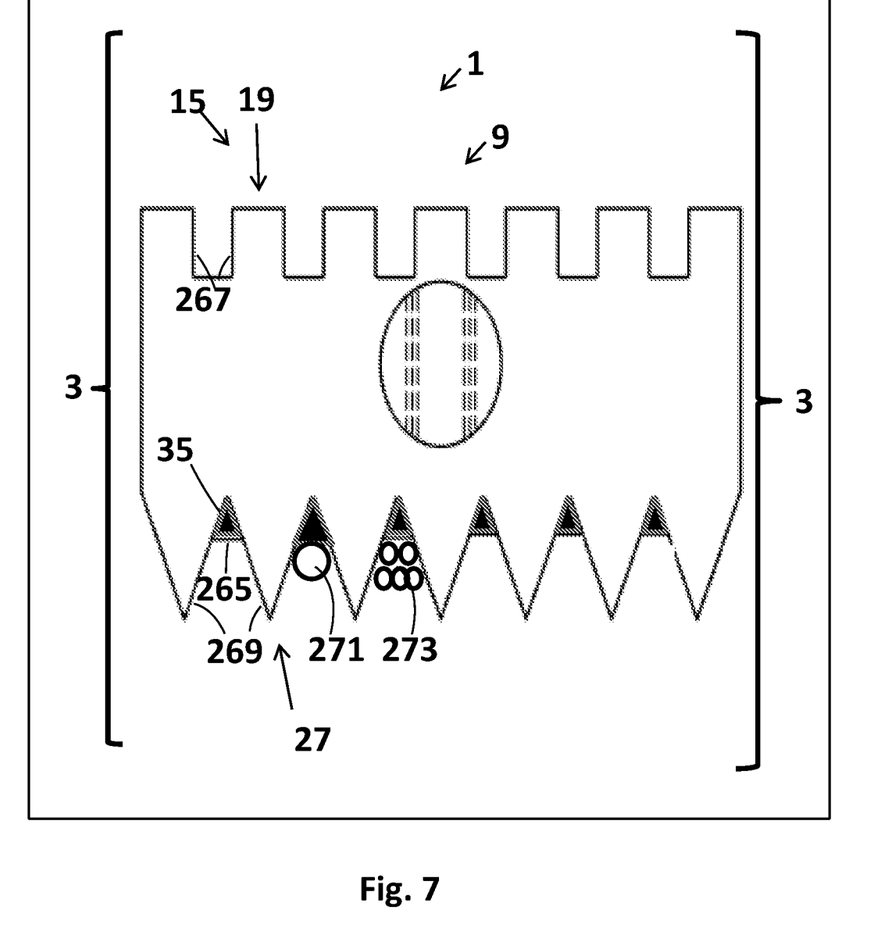
FIG. 7 depicts an exploded view of FIG. 3, in accordance with embodiments of the present invention.

In one embodiment, the gaps between triangular prism shaped teeth are partially filled in to form pressure blocks 35. The height 135 of the pressure blocks is about 10% to 40% of the height 131 of the triangular prism shaped teeth 27. The height 135 of the pressure blocks is equal to the length of the line B-B', as shown in FIG. 3. The height 131 of the triangular prism shaped teeth 27 is equal to the length of the lines B-E, from the second side 13 of the rake block 9 to the top or highest edge 31 of the triangular prism shaped teeth 27, as shown in FIG. 3. In one embodiment, the height 135 of the pressure blocks is 0.4 cm and the height 131 of the triangular prism shaped teeth is 1 cm. The pressure blocks 35 strip leaves from the stem of herbs or spices on a third side 265, in addition to the two sides 269 of the stem stripped by the sides of the triangular prism shaped teeth 27, as depicted in FIG. 7, and described in associated text, herein.

Figure 6:
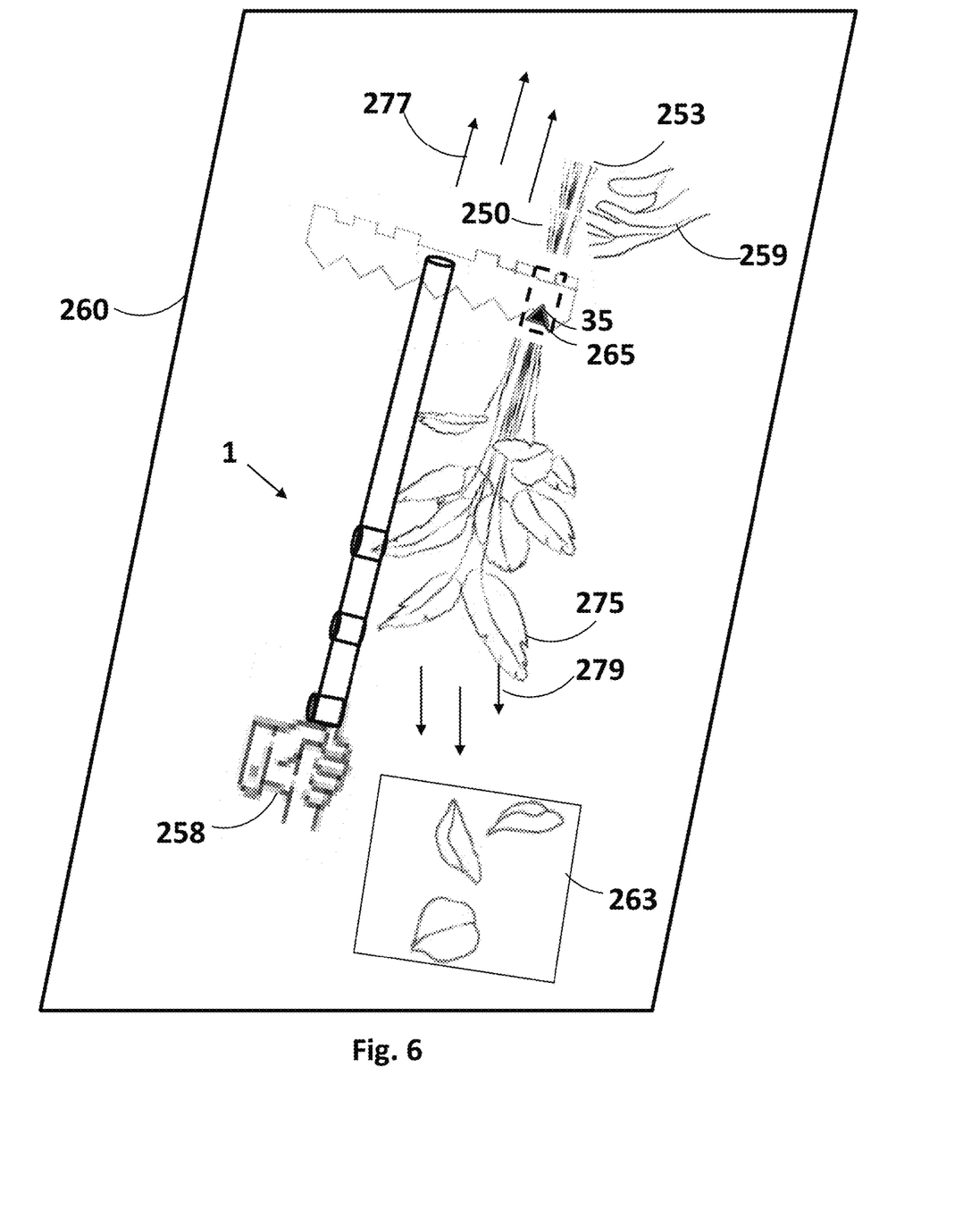
FIG. 6 depicts an elevation view of the apparatus 1 in use according the flow diagram of method 137, depicted in FIG. 8, in accordance with embodiments of the present invention.
Figure 8A:
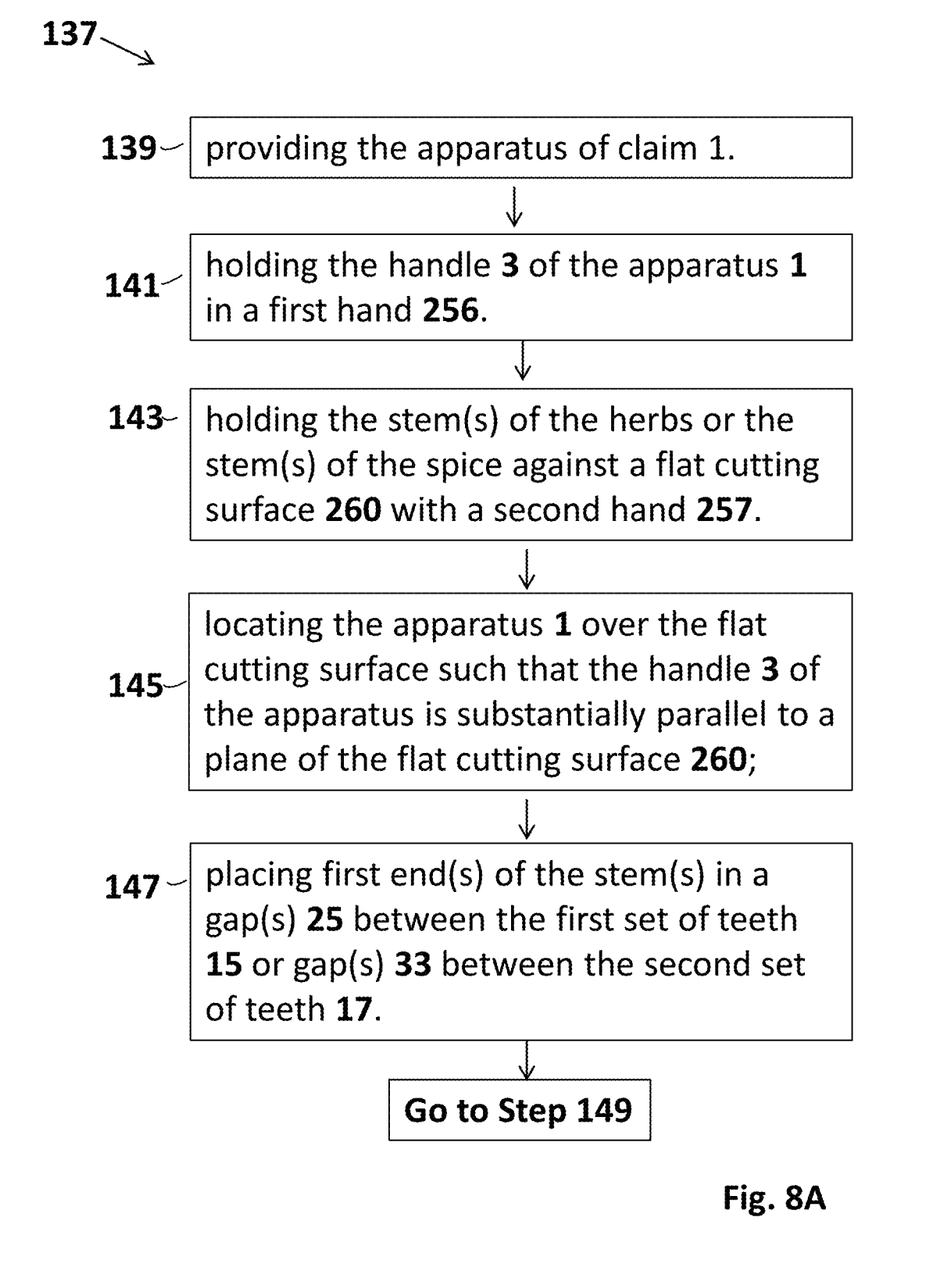
FIGS. 8A-8B depict a flow diagram of a method 137, in accordance with embodiments of the present invention.
Figure 8B:
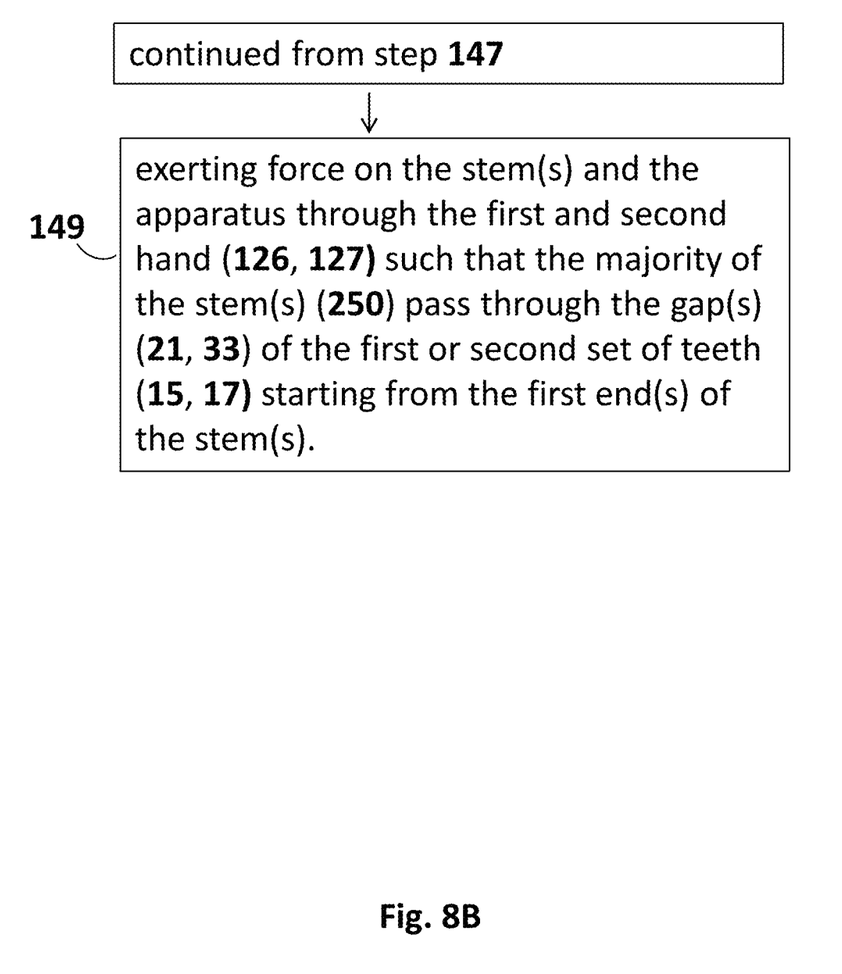

In an embodiment, the blunt stripping edge 265 of the pressure blocks 35 applies a blunt stripping or ripping force against the stem(s) 250 of the herb or spice plants, that would not be applied without the pressure block 35 partially filling the depth of the triangular prism shaped gap 33 to a pre-specified depth, depicted in FIG. 6, and described in associated method 137, steps 147-153 of Flow Diagram depicted in FIGS. 8A-8B.

Figure 4:
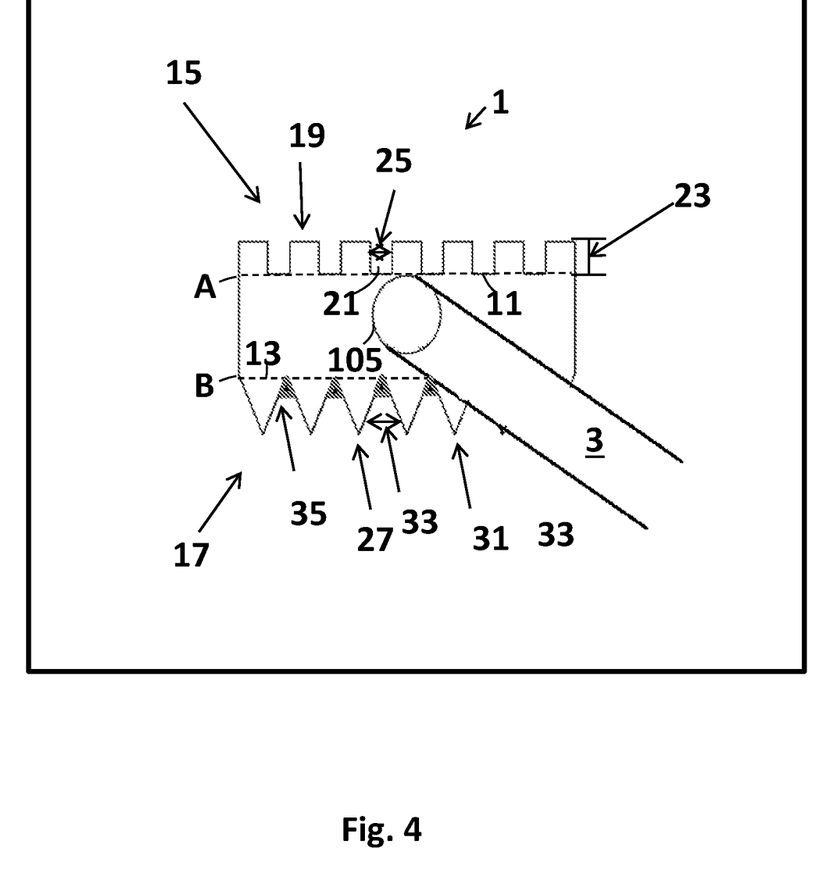
FIG. 4 depicts an elevated rear view of the apparatus, in accordance with embodiments of the present invention.

FIG. 4 depicts an elevated rear view of the apparatus, in accordance with embodiments of the present invention. FIG. 4 provides a view of the proximal end 5 of handle 3, between the handle 3 and the rake block 9.

Figure 5:
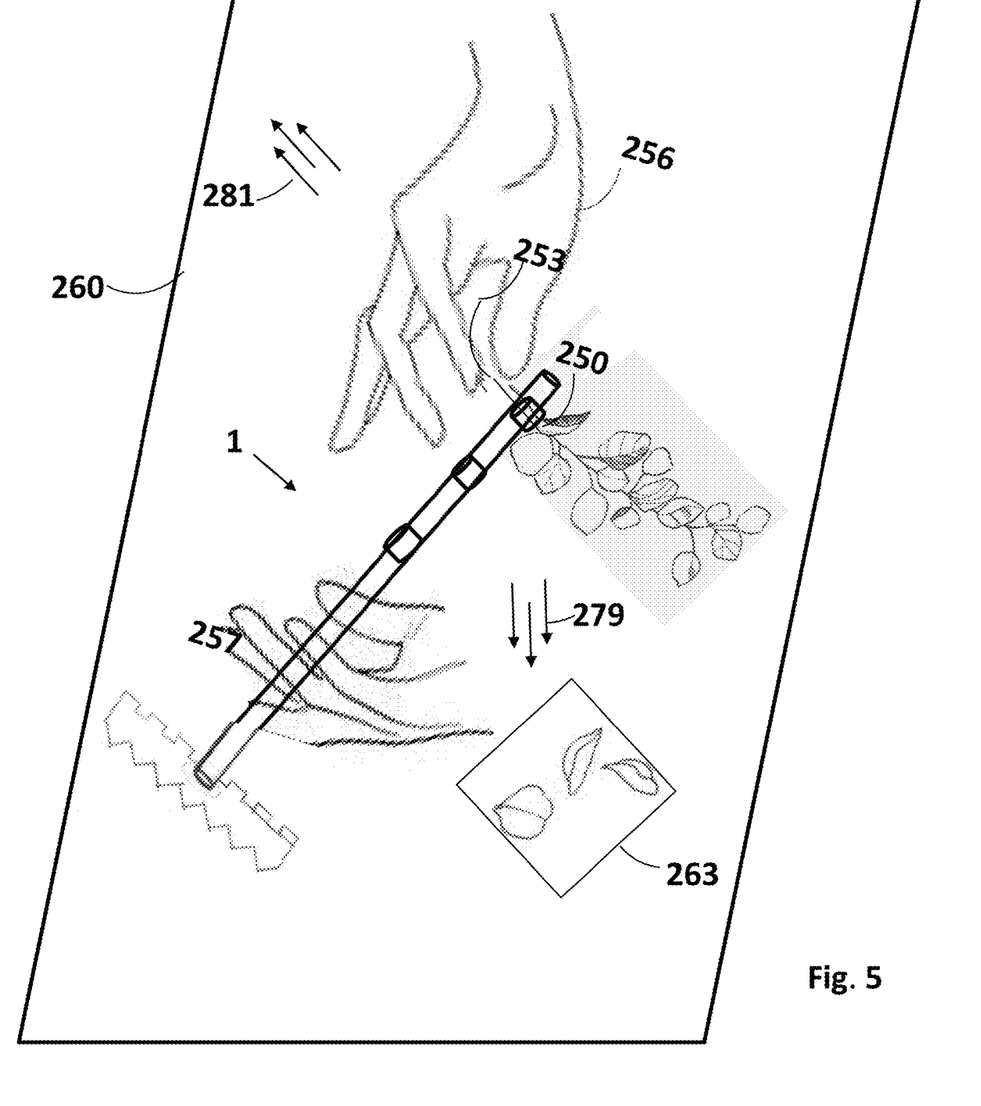
FIG. 5 depicts an elevation view of the apparatus, in use according to the flow diagram of method 153, depicted in FIG. 9, in accordance with embodiments of the present invention.
Figure 9:
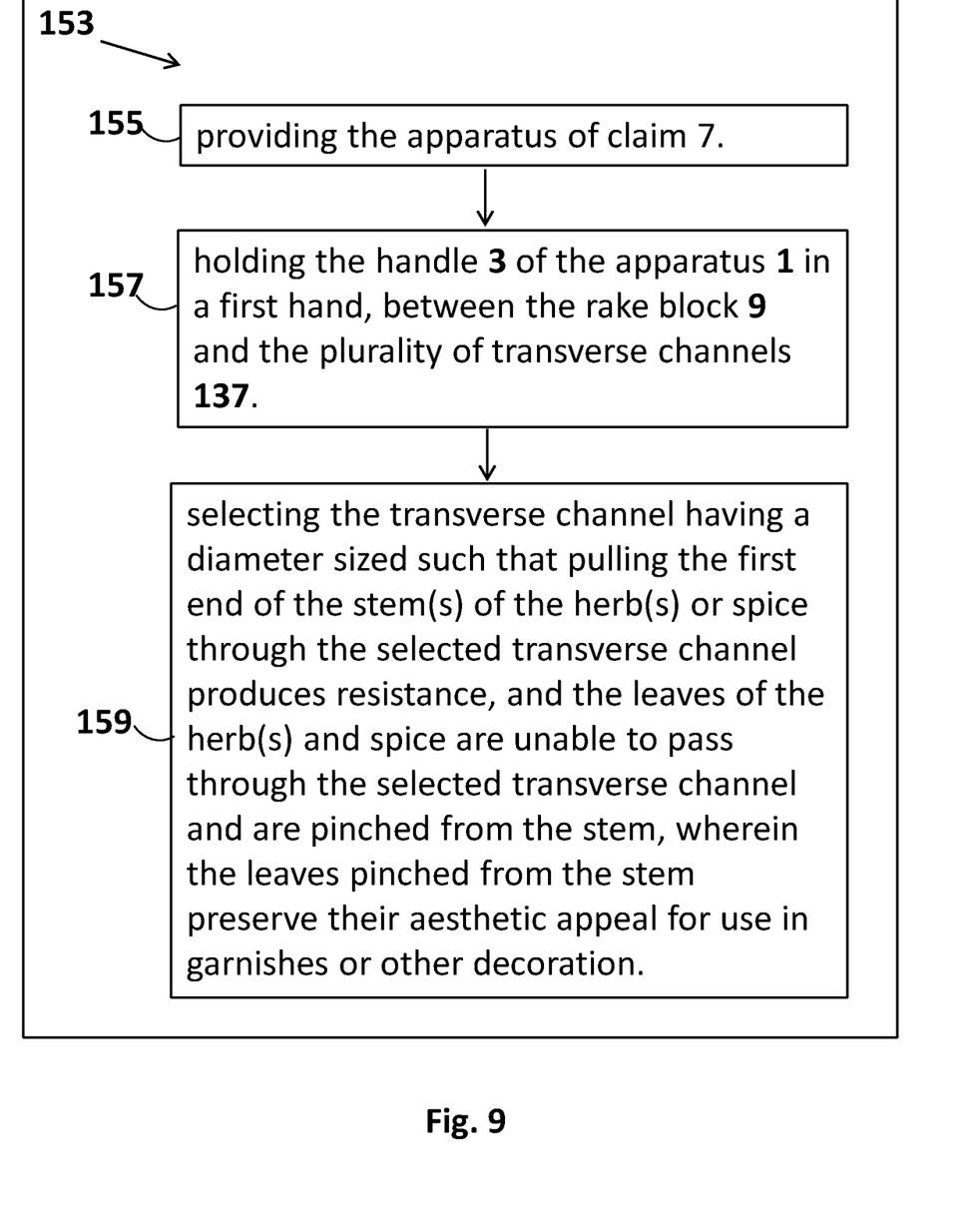
FIG. 9 depicts a flow diagram of a method 153, in accordance with embodiments of the present invention.

FIG. 5 depicts an elevation view of the apparatus 1, in use according to the flow diagram of method 153, depicted in FIG. 9, in accordance with embodiments of the present invention.

FIG. 6 depicts an elevation view of the apparatus 1 in use according the flow diagram of method 137, depicted in FIGS. 8A-8B, in accordance with embodiments of the present invention.

FIG. 7 depicts an exploded view of FIG. 3, after the blunt stripping edge 265 of the pressure blocks 35 applies a blunt stripping or ripping force against the stem(s) 250, 271, 273 of the herb or spice plants, that is advantageously applied because the pressure block 35 partially filling the depth of the triangular prism shaped gap 33 to a pre-specified depth, depicted in FIG. 6, and described in associated method 137, steps 147-153 of Flow Diagram depicted in FIGS. 8A-8B. The leaves are striped from the stem on two sides by the edges 269 of the triangular prism teeth 27 or edges 267 of the rectangular or square prism teeth 19 as the rake block 9 is pulled over the stems. The effectiveness of stripping leaves from the stem(s) 250, 271, 273 is advantageously increased because the blunt stripping edge 265 of the pressure block(s) blunt edge augments the applied stripping force from blunt stripping edge(s) 269 from the triangular prism shaped teeth 27, by providing a third blunt force stripping edge 265.

The triangular prism shaped teeth 27 of the apparatus 1 are optimized for stem(s) 271 larger than the stems that fit through the transverse channels or bundles of the stems 273 that do not fit through the transverse channels, by forming pressure block(s) 35 by partially filling the depth of the triangular prism shaped gap 33 to a pre-specified depth, depicted in FIG. 6, and described in associated method 137, steps 147-153 of Flow Diagram depicted in FIGS. 8A-8B. The effectiveness of stripping leaves from the stem(s) 250, 271, 273 is advantageously increased because the blunt stripping edge 265 of the pressure block(s) blunt edge augments the applied stripping force from blunt stripping edge(s) 269 from the triangular prism shaped teeth 27 by providing a third blunt force stripping edge 265.

FIGS. 8A-8B depict a flow diagram of a method 137 of removing stems from leaves of herbs and spices, in accordance with embodiments of the invention. In the method 137 of stripping leaves from stem(s) or spice, a first step 139 of the method 137 comprises providing the apparatus of claim 1. A second step 141 of the method 137 comprises holding the handle 3 of the apparatus 1 in a first hand 258. A third step 143 of the method 137 comprises holding the stem(s) of the herbs or the stem(s) of the spice against a flat cutting surface 260 with a second hand 259. A fourth step 145 of the method 137 comprises locating the apparatus 1 over the flat cutting surface such that the handle 3 of the apparatus is substantially parallel to a plane of the flat cutting surface 260. A fifth step 147 of the method 137 comprises placing first end(s) 253 of the stem(s) 250 in a gap(s) 25 between the first set of teeth 15 or gap(s) 33 between the second set of teeth 17. A sixth step 149 of the method 137 comprises exerting force on the stem(s) and the apparatus through the first and second hand such that the majority of the stem(s) pass through the gap(s) of the first or second set of teeth starting from the first end(s) 253 of the stem(s) 250 in a direction of the arrow 277. The leaves of the herb(s) or spice which are unable to pass through the gaps between the teeth are stripped from the stem(s) by this process.

In an embodiment, the second set of teeth 17 of the apparatus used in the method 137 is selected from the group consisting of triangular prism shaped teeth 27 having triangular prism shaped gaps 33 between them. Each triangular prism shaped tooth 27 forms a top or highest edge 31 along the line E-E. The gaps 33 between triangular prism shaped teeth 27 are partially filled in to form pressure blocks 35. In this embodiment, there is a seventh step 151 of the method 137 comprising the pressure blocks 35 stops additional leaves of the herb(s) or spice from passing through the gaps between the triangular prism shaped teeth 27 causing the leaves to be stripped from the stem(s).

FIG. 9 depicts a flow diagram of a method 153 of removing stems from leaves of herbs and spices, in accordance with embodiments of the invention. In the method 153 a first step 155 comprising providing the apparatus of claim 7. A second step 157 of the method 153 comprises holding the handle 3 of the apparatus 1 in a first hand 257, between the rake block 9 and the plurality of transverse channels 137. A third step 159 of the method 153 comprises selecting the transverse channel having a diameter sized such that pulling the first end 253 of the stem(s) 250 of the herb(s) or spice through the selected transverse channel in the direction shown by arrows 281 using second hand 256 produces resistance, and the leaves of the herb(s) and spice are unable to pass through the selected transverse channel and are pinched from the stem 250 and collect in a pile 263 of pinched leaves. The leaves pinched from the stem preserve their aesthetic appeal for use in garnishes or other decoration.

While exemplary embodiments have been specifically disclosed, it should be understood that the practice of this invention is not limited to those embodiments. Modifications and variations falling within the spirit of the invention will occur to those skilled in the art. Therefore, it is not intended that the scope of the invention be determined by the disclosed exemplary embodiments, but rather should be determined by the breadth of the appended claims.

I claim:

1. An apparatus (1) for removing leaves from stems of herbs and spices, comprising:
   a handle (3), and
   a rake block (9),
      wherein the handle (3) is operably coupled to the rake block (9) at a proximal end (5),
      wherein the rake block has a first side (11) and a second side (13),
      wherein the first side of the rake block has a first set of teeth (15),
      wherein the second side of the rake block has a second set of teeth (17),
      wherein the first set of teeth and the second set of teeth are different shapes, and
      wherein the first set of teeth is selected from the group consisting of rectangular or square prism shaped teeth (19), with rectangular or square prism shaped gaps (21) between them.

2. The apparatus of claim 1, wherein the second set of teeth (17) is selected from the group consisting of triangular prism shaped teeth (27) having triangular prism shaped gaps (33) between them.

3. The apparatus of claim 2, wherein each triangular prism shaped tooth (27) forms a top or highest edge (31) along a line E-E, and wherein the gap (33) between adjacent top or highest edge (31) of the triangular prism shaped teeth is about 0.8 cm in length.

4. The apparatus of claim 3, wherein the gaps between triangular prism shaped teeth are partially filled in to form pressure blocks (35),
   wherein the height (135) of the pressure blocks is about 10% to 40% of the height (131) of the triangular prism shaped teeth,
   wherein the height (135) of the pressure blocks is equal to the length of the line B-B', and
   wherein the height (131) of the top or highest edge (31) of the triangular prism shaped teeth (27) is equal to the length of the line E-E.

5. The apparatus of claim 4, wherein the edge(s) of the pressure blocks (35) are blunt.

6. The apparatus of claim 1, comprising a plurality of transverse channels (39, 41, 43), arranged in a longitudinal array (130), wherein each transverse channel (39, 41, 43) has sequentially smaller diameters.

7. The apparatus of claim 6, wherein the diameter of each transverse channel is selected from the group consisting of 2.5 mm, 3 mm, 4 mm, 5 mm, 6 mm, 7 mm, and 13 mm.

8. The apparatus of claim 6, comprising three transverse channels (39, 41, 43) arranged in a longitudinal array (130).

9. The apparatus of claim 6, the longitudinal array (130) extending from the distal end (7) of the handle (3), the transverse channels of the longitudinal array are substantially equally separated from each subsequent transverse channel, as measured from the center of each transverse channel, and the separation of the nearest transverse channel from the distal end (7) is the same separation as its separation from subsequent transverse channels.

10. The apparatus of claim 6, wherein the transverse channels are substantially smooth.

11. The apparatus of claim 1, wherein the handle is cylindrical.

12. The apparatus of claim 1, wherein the handle is operably coupled to the rake block at a connection point (45) that is offset of a midpoint of the rake block (9), and wherein the connection point is closer to the first side (11) of the rake block.

13. The apparatus of claim 1, wherein the handle and the rake block are of a one-piece construction.

14. The apparatus of claim 13, wherein the handle and the rake block are formed as a unit without a seam.

15. A method of stripping leaves from stem(s) or spice, comprising:
   providing the apparatus of claim 1;
   holding the handle of the apparatus in a first hand;
   holding the stem(s) of the herbs or the stem(s) of the spice against a flat cutting surface with a second hand;
   locating the apparatus over the flat cutting surface (260) such that the handle of the apparatus is substantially parallel to a plane of the flat cutting surface (260);
   placing first end(s) of the stem(s) in a gap(s) between the first set of teeth or the second set of teeth;
   exerting force on the stem(s) and the apparatus through the first and second hand such that the majority of the stem(s) pass through the gap(s) of the first or second set of teeth starting from the first end(s) of the stem(s), wherein the leaves of the herb(s) or spice which are unable to pass through the gaps between the teeth and are stripped from the stem(s).

16. The method of claim 15,
wherein the second set of teeth (17) of the apparatus is selected from the group consisting of triangular prism shaped teeth (27) having triangular prism shaped gaps (33) between them,
wherein each triangular prism shaped tooth (27) forms a top or highest edge (31) along a line E-E,
wherein the gaps between triangular prism shaped teeth are partially filled in to form pressure blocks (35), and
wherein the pressure blocks (35) stops additional leaves of the herb(s) or spice from passing through the gaps between the triangular prism shaped teeth causing the leaves to be stripped from the stem(s).

17. A method of stripping leaves from stem(s) or spice, comprising:
providing the apparatus of claim 6;
holding the handle of the apparatus in a first hand, between the rake block and the plurality of transverse channels;
selecting the transverse channel having a diameter sized such that pulling the first end of the stem(s) of the herb(s) or spice through the selected transverse channel produces resistance, and the leaves of the herb(s) and spice are unable to pass through the selected transverse channel and are pinched from the stem,
wherein the leaves pinched from the stem preserve their aesthetic appeal for use in garnishes or other decoration.

* * * * *